United States Patent [19]

Müller

[11] Patent Number: 4,701,099
[45] Date of Patent: Oct. 20, 1987

[54] APPARATUS FOR RECOVERING AND TOWING A VEHICLE

[75] Inventor: Karl-Heinz Müller, Steinen, Fed. Rep. of Germany

[73] Assignee: Rotzler GmbH & Co., Steinen, Fed. Rep. of Germany

[21] Appl. No.: 802,858

[22] Filed: Nov. 27, 1985

[30] Foreign Application Priority Data

Nov. 27, 1984 [DE] Fed. Rep. of Germany ....... 3443110

[51] Int. Cl.[4] ....................... B66C 1/68; B66C 23/36; B66C 23/82
[52] U.S. Cl. .................... 414/563; 212/259; 280/402
[58] Field of Search .......... 414/563; 280/402; 212/259; 114/210, 254

[56] References Cited

U.S. PATENT DOCUMENTS

| | | | |
|---|---|---|---|
| 2,554,804 | 5/1951 | Amundson | 114/210 |
| 2,782,944 | 2/1957 | Macklin | 414/563 |
| 2,940,412 | 6/1960 | Whitney | 114/210 |
| 3,690,482 | 9/1972 | Gaumont | 414/563 |
| 3,888,369 | 6/1975 | Kesselring | 414/563 |
| 3,931,957 | 1/1976 | Thibodeaux | 414/563 X |
| 4,384,817 | 5/1983 | Peterson | 414/563 |
| 4,487,396 | 12/1984 | Hoffman | 414/563 X |
| 4,600,353 | 7/1986 | Phillips, Jr. | 414/563 |

FOREIGN PATENT DOCUMENTS 438606  1/1975  U.S.S.R. ............................. 212/259

*Primary Examiner*—Joseph E. Valenza
*Assistant Examiner*—David A. Bucci
*Attorney, Agent, or Firm*—Becker & Becker, Inc.

[57] ABSTRACT

An apparatus for recovering and towing a vehicle. The apparatus is provided on a truck that has a winch with a draw cable. The apparatus includes a crane having a frame, which is connected to the truck, a boom, which is pivotably connected to the frame, and a lifting bracket, which can be connected to a vehicle that is to be towed. The draw cable is detachably connected to the boom by a coupling. To lower and raise the lifting bracket via the draw cable, the pivotable connection of the boom to the frame is effected by a substantially horizontally extending shaft connected to the frame.

12 Claims, 12 Drawing Figures

APPARATUS FOR RECOVERING AND TOWING A VEHICLE

BACKGROUND OF THE INVENTION

1. Field of the Invention

The present invention relates to an apparatus for recovering and towing a vehicle, with the apparatus being provided on a truck that has a winch with a draw cable.

2. Description of the Prior Art

Trucks are known that are provided with a towing crane, as well as with a winch having a draw cable in order to be able to perform other operations, such as pulling in tree trunks, etc. In order to raise a vehicle that is to be towed, the crane itself has its own drive mechanism. As a result, the crane becomes expensive and complex, and is furthermore deficient in that the vehicle that is to be towed can often not be drawn close enough to the rear axle of the towing vehicle, resulting in a removal of load from the front axle of the towing vehicle. This means that the towing vehicle can only be driven at a reduced speed, because the steering capability of the towing vehicle is not always assured.

An object of the present invention is to improve an apparatus of the aforementioned general type in such a way that the crane is as straightforward and economical as possible, that the apparatus has a low weight, and that it is possible to draw the vehicle that is to be towed directly against the towing vehicle.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The apparatus of the present invention comprises a crane that includes a frame, which is connected to the truck, a boom, which is pivotably connected to the frame, and a lifting bracket, which is connectable to a vehicle that is to be towed; coupling means for detachably connecting the draw cable to the boom; and a substantially horizontally extending shaft that is connected to the frame, at a location remote from the coupling means, to effect the pivotable connection of the boom to the frame; the lifting bracket is operatively associated with the draw cable and with the boom in such a way that it can be raised and lowered.

Further advantageous specific embodiments of the present invention will be described subsequently.

DESCRIPTION OF PREFERRED EMBODIMENTS

Figure 1:
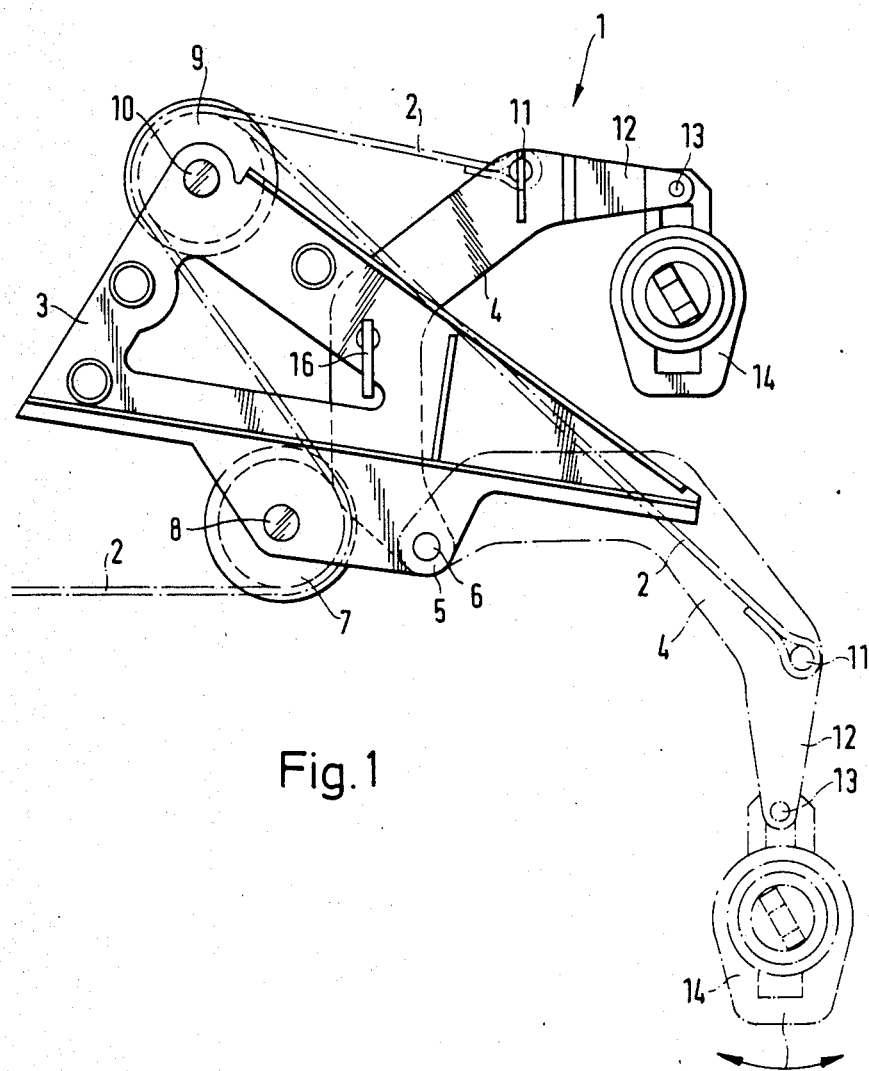
FIG. 1 is a side view of one inventive embodiment of the recovering and towing apparatus.
Figure 2:
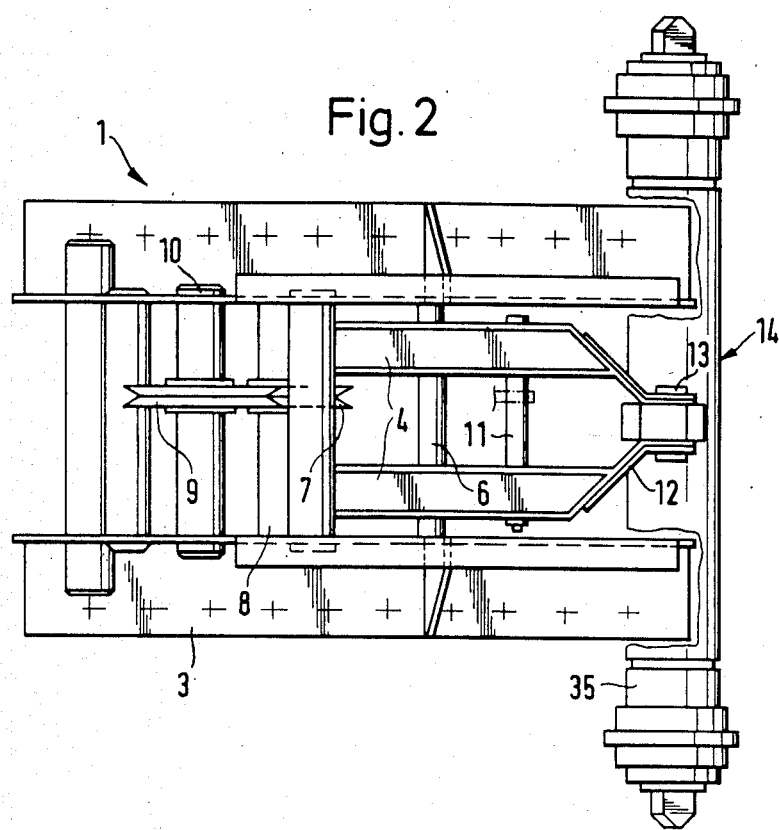
FIG. 2 is a plan view of the apparatus of FIG. 1.
Figure 3:
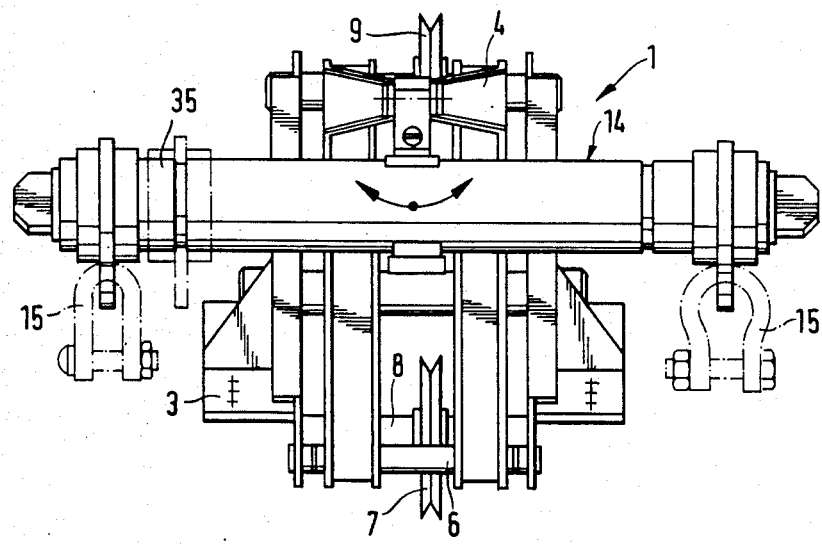
FIG. 3 is a front view of the apparatus of FIG. 1.
Figure 4:
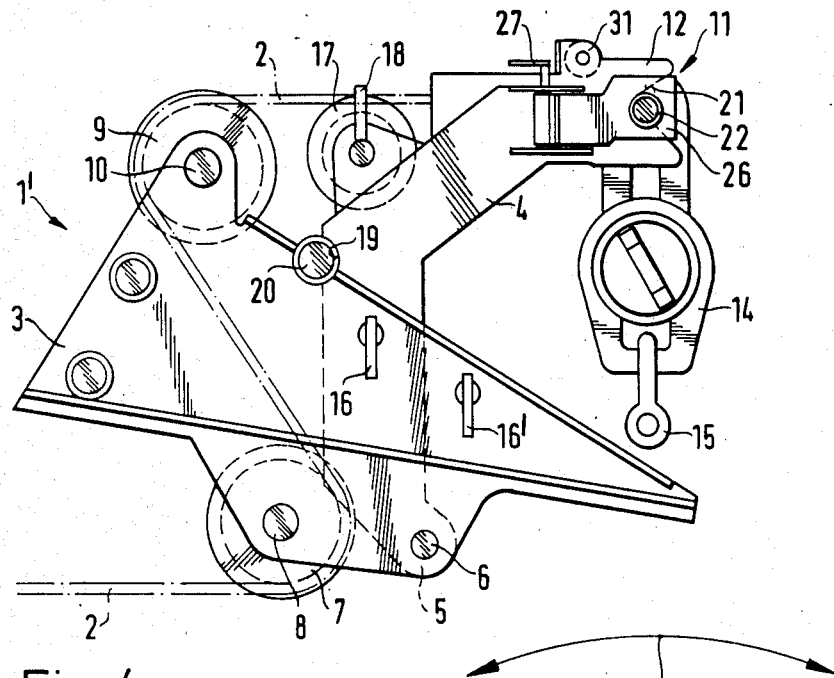
FIG. 4 is a side view of a further inventive embodiment of a recovering and towing apparatus.
Figure 5:
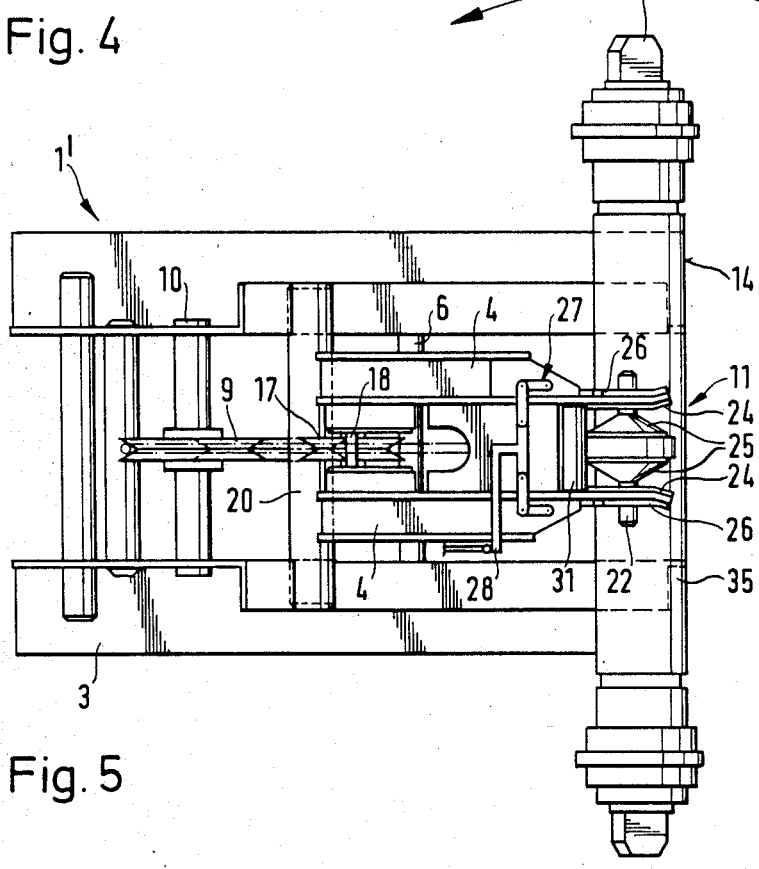
FIG. 5 is a plan view of the apparatus of FIG. 4.

Referring now to the drawings in detail, the recovery and towing apparatus illustrated in FIGS. 1 to 3 has a crane 1 that is disposed upon the rearend of a truck, which is not illustrated. A winch having a draw cable 2 is installed in the vehicle. The winch can be utilized to perform a number of tasks at construction sites, and in woods and fields, such as for hauling tree trunks or the like. The crane 1 includes a steel frame 3 and an arm or boom 4, the lower end portion 5 of which is pivotably mounted on the frame 3 via a horizontal shaft 6.

Next to the shaft 6 of the boom 4, but at a distance therefrom, a guide pulley 7 is rotatably mounted on the bottom of the frame 3 via a shaft 8. A further guide pulley 9 is mounted on a shaft 10 at the upper corner region of the approximately triangular frame 3. The two guide pulleys 7 and 9 are disposed one above the other in a laterally offset manner in such a way that the draw cable 2 is guided around the two pulleys 7, 9 in an S-shaped manner. The lower part of the cable 2 leads to the nonillustrated integrated winch of the truck. The upper end of the cable 2 is detachably secured to a coupling 11 that can essentially comprise a fixable cross bolt, and that is disposed on the end portion 12 of the boom 4 opposite the end portion 5 thereof. In this way, the draw cable 2 can be used not only for the towing operation of the crane 1 of the recovery and towing apparatus, but can also be utilized without the crane for various other winch operations after it has been detached from the coupling 11.

When the winch that is installed in the truck is put into operation, the boom 4 can be pivoted about the shaft 6 by withdrawing the cable 2. In this way, the boom 4, along with the lifting bracket 14 that is connected to the end portion 12 by a pivot bolt 13, are lowered into the position illustrated by dot-dash lines in FIG. 1. In one of the lower positions of the boom 4, the lifting bracket 14 is connected to the vehicle that is to be towed via elements 15 that are attached to the bracket 14. The draw cable 2 is thereupon drawn in by the winch, so that the boom 4 pivots upwardly about the shaft 6. In the upper end position, the boom 4 is expediently fixed in position on the frame 3 of the crane 1 by a locking pin 16, resulting in a reliable securing of the boom 4. The locking pin 16 is advantageously provided in the region between the coupling 11 of the cable 2, and the lower pivot shaft 6 of the boom 4.

In the embodiment illustrated in FIGS. 4 to 12. the crane 1' is embodied approximately the same as the crane 1 of the previously described embodiment of FIGS. 1 to 3. To this end, the crane 1' also has a frame 3 to which the lower end portion 5 of a boom 4 is pivotably mounted via a shaft 6. The frame 3 also has a lower guide pulley 7 and an upper guide pulley 9 that are rotatable about shafts 8 and 10 respectively, and are disposed in such a way that the cable 2 can be guided about the two pulleys 7, 9 in an S-shaped manner. An additional rotatably mounted guide pulley 17 for the cable 2 is disposed on the boom 4 in the region between the upper guide pulley 9 and the coupling 11. A safety arm 18 that extends over the cable 2 is associated with the guide pulley 17.

Also in this embodiment, the boom 4 can be fixed in the uppermost retracted position via a locking pin disposed approximately in the central region of the frame 3; the boom 4 is fixed in position in such a way that it cannot be unintentionally released. In this uppermost position, a recess 19 on the backside of the boom 4 abuts a crossbar 20 of the frame 3.

Figure 6:
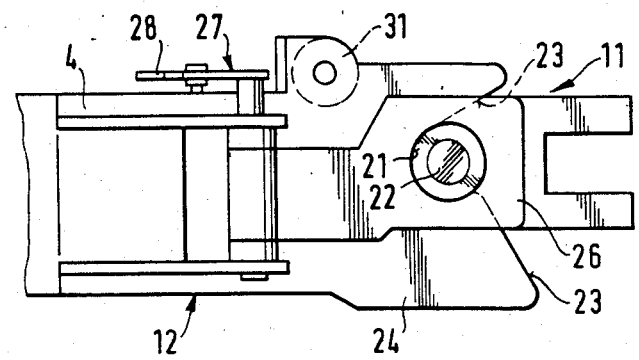
FIG. 6 is an enlarged partial side view of the coupling region on the boom of the apparatus of FIG. 4.

In this embodiment, the detachable coupling 11 of the cable 2 on the boom 4 comprises an approximately C-shaped stop recess 21 provided at the free end portion 12 of the boom 4, and a coupling pin 22 that is associated with the lifting bracket 14 and engages in the C-shaped stop recess 21 when the cable 2 is drawn in. The end of the cable 2 is secured to the lifting bracket 14. So that the coupling pin 22 can, to a large extent, positively and reliably slide into the stop recess 21 of the boom 4, the open side of the stop recess 21 is expediently provided with two outwardly diverging slanted lead-in surfaces 23 (FIG. 6).

At least at the end region 12, the boom 4 is embodied as a pronged member having two parallel legs 24. A respective C-shaped stop recess 21 is embodied in each of the legs 24. In addition, in order to be able to introduce the coupling pin 22 into the stop recesses 21 in a centered manner, the coupling pin 22 is provided with two oppositely disposed conical or hemispherical guide elements 25 that are provided in the region between the legs 24 and thus assure a satisfactory centered introduction of the pin 22 into the pronged region of the boom 4.

Figure 7:
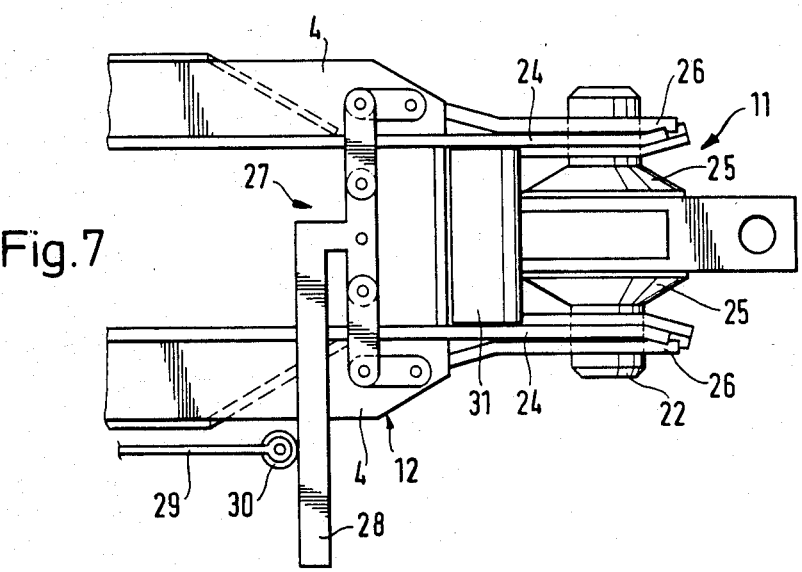
FIG. 7 is a plan view of the coupling region shown in FIG. 6 in a locked position.
Figure 8:
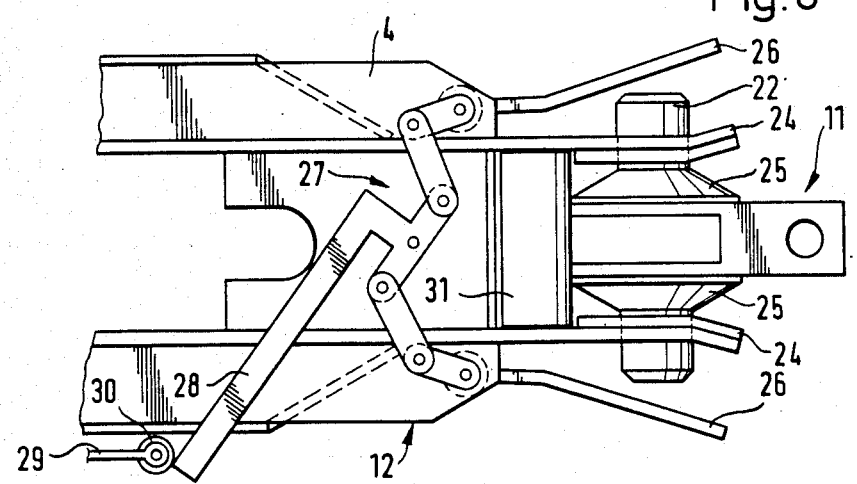
FIG. 8 is a plan view of the coupling region shown in FIG. 6 in an unlocked position.

As shown particularly clearly in FIGS. 7 and 8, there is associated with the coupling 11 a securing mechanism having two securing rods 26 that extend over the two ends of the coupling pin 22 to fix the position of the latter in the stop recesses 21 of the boom 4. The securing rods 26 are pivotably mounted on the boom 4 and are connected with a lever system 27 that is also disposed on the boom 4. The lever system 27 has a central control handle 28 that extends at right angles to the boom 4. By pivoting the control handle 28, the two securing rods 26 are moved by the lever system 27. Pivoting of the control handle 28 is advantageously effected via a control element 29 that is, for example, displaceably supported in the longitudinal direction of the boom 4 and has a roller 30 disposed on one end that cooperates with the control handle 28. In FIG. 7, the securing rods 26 are closed, so that the coupling pin 22 is securely locked in position in the stop recesses 21 of the boom 4. In FIG. 8, the securing rods 26 are in their open position, so that the free ends of the coupling pin 22 are released and can slide out of the stop recesses 21.

Figure 9:
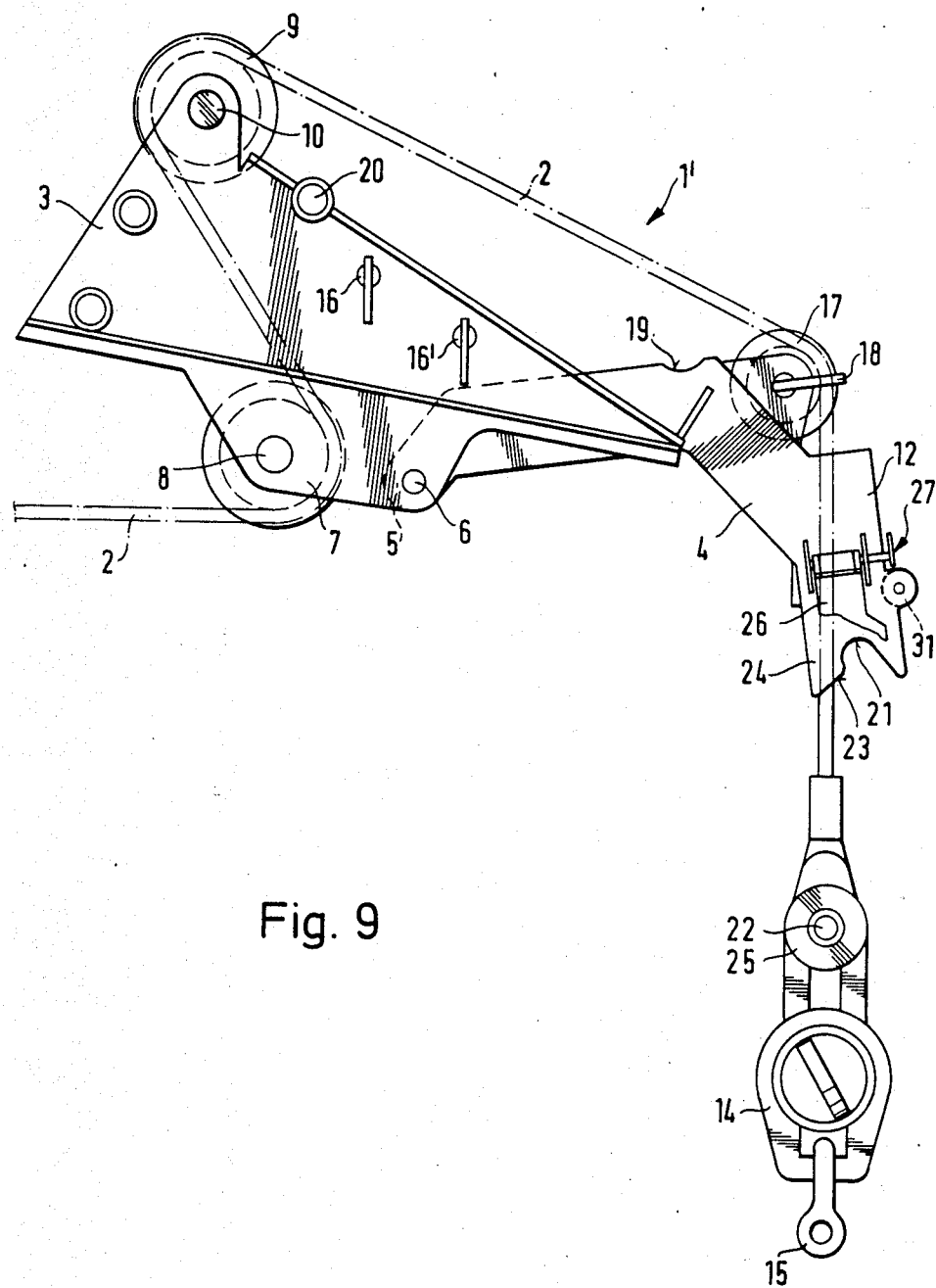
FIG. 9 is a side view of the apparatus of FIG. 4, with the boom pivoted down and the lifting bracket lowered.

In FIG. 9, the boom 4 is illustrated in the downwardly pivoted end position, so that the opening of the stop recess 21 with the lead-in surfaces 23 faces downwardly. The lifting bracket 14 is lowered slightly further via the further withdrawn cable 2, so that the coupling pin 22 is disposed beyond, i.e. below, the stop recess 21. In this position, the vehicle that is to be towed can be easily suspended on the connection elements 15 without obstruction, and can be raised by drawing the cable 2 in. In this connection, to establish the coupling 11, the coupling pin 22 slides into the stop recess 21 of the boom 4, and the latter, as it pivots about the shaft 6, is drawn upwardly.

Figure 10:
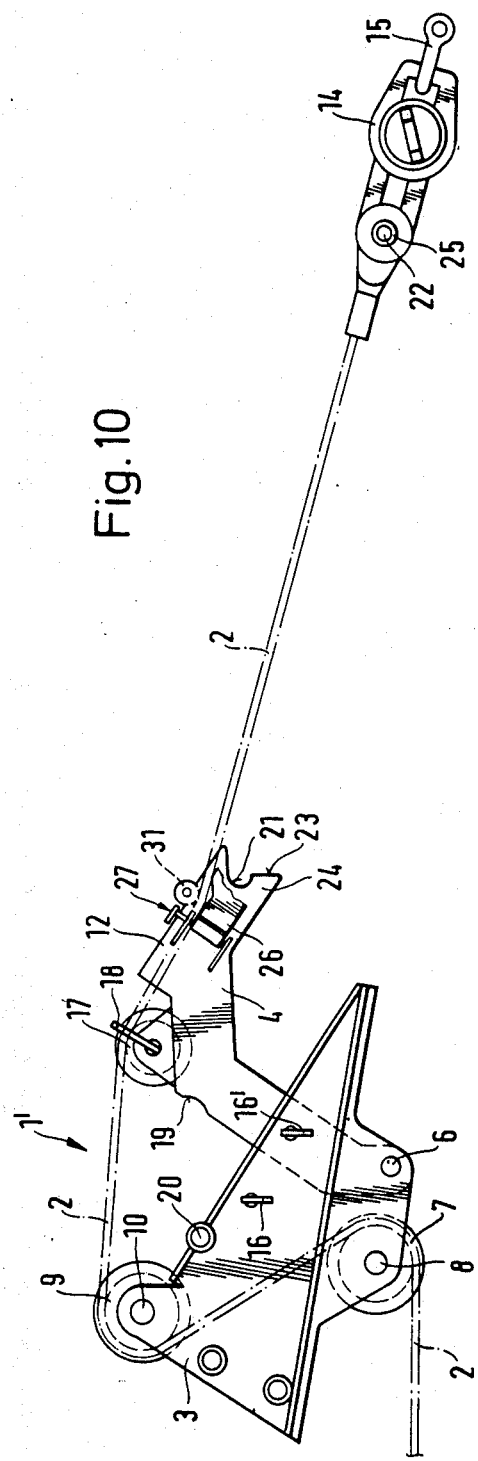
FIG. 10 is a side view of the apparatus of FIG. 4, with the boom pivoted toward the front and the lifting bracket withdrawn.

As shown in FIG. 10, it is also possible with the inventive recovering and towing apparatus to start by drawing in a vehicle that is to be towed and is located several meters from the towing vehicle. For this purpose, the boom 4 is pivoted forward by about half of its pivot path, and is fixed in this position by a further locking pin 16'. The draw cable 2 is pulled way out, so that the lifting bracket 14 is disposed far in front of the boom 4. In order to satisfactorily guide the cable 2, there is additionally provided on the front of the boom 4 a retaining roller 31 that extends over the cable 2. By retracting the cable 2, the vehicle that is to be towed is drawn toward the boom 4 until the coupling pin 22 engages the stop recess 21 to establish the coupling 11. The locking pin 16' is then released, and as a result of a further retraction of the cable 2 the boom 4 is pivoted upwardly into its end position, whereby the vehicle that is to be towed is raised. When the coupling pin 22 slides into the stop recess 21, the securing rods 26 automatically close, so that the coupling pin 22 is securely locked in position.

Figure 11:
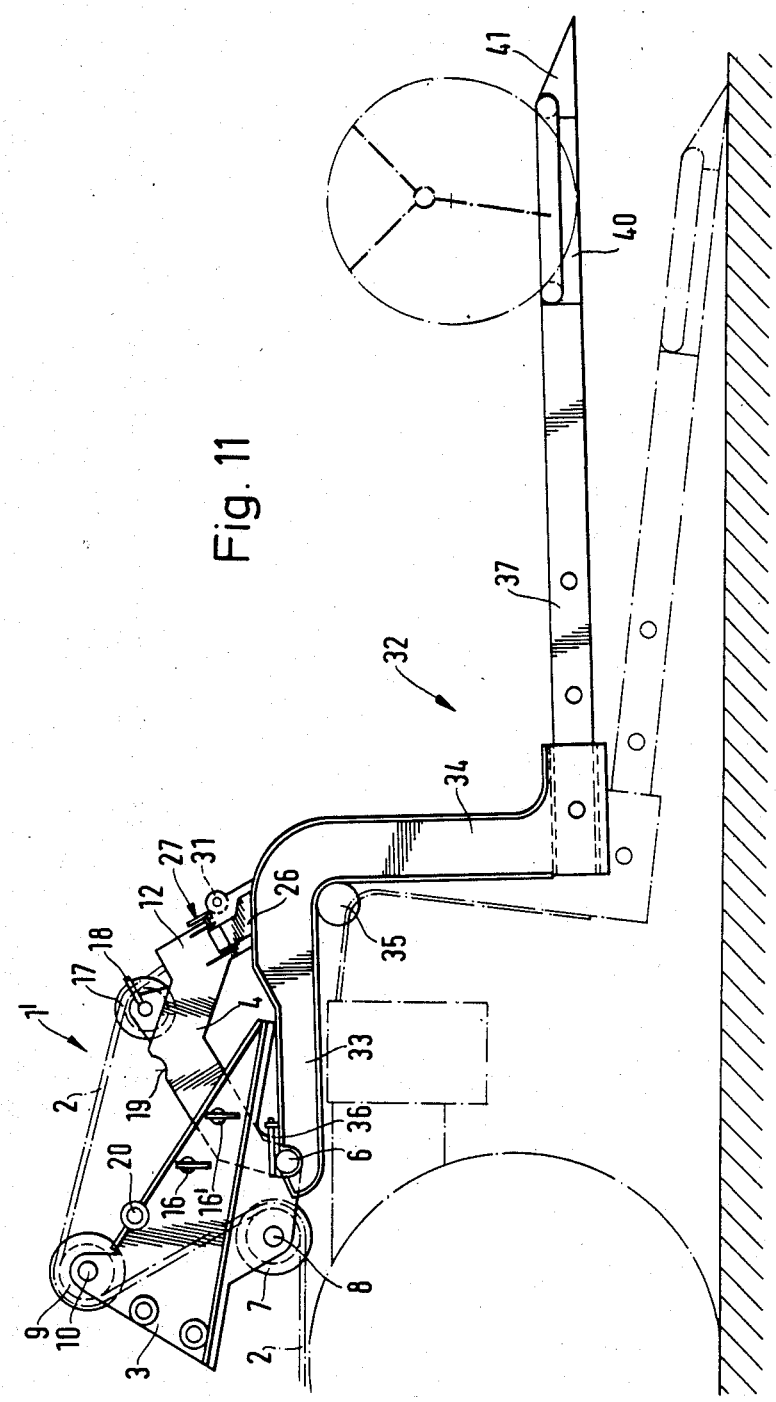
FIG. 11 is a side view of the apparatus of FIG. 4, with an additional Z-shaped supporting device.
Figure 12:
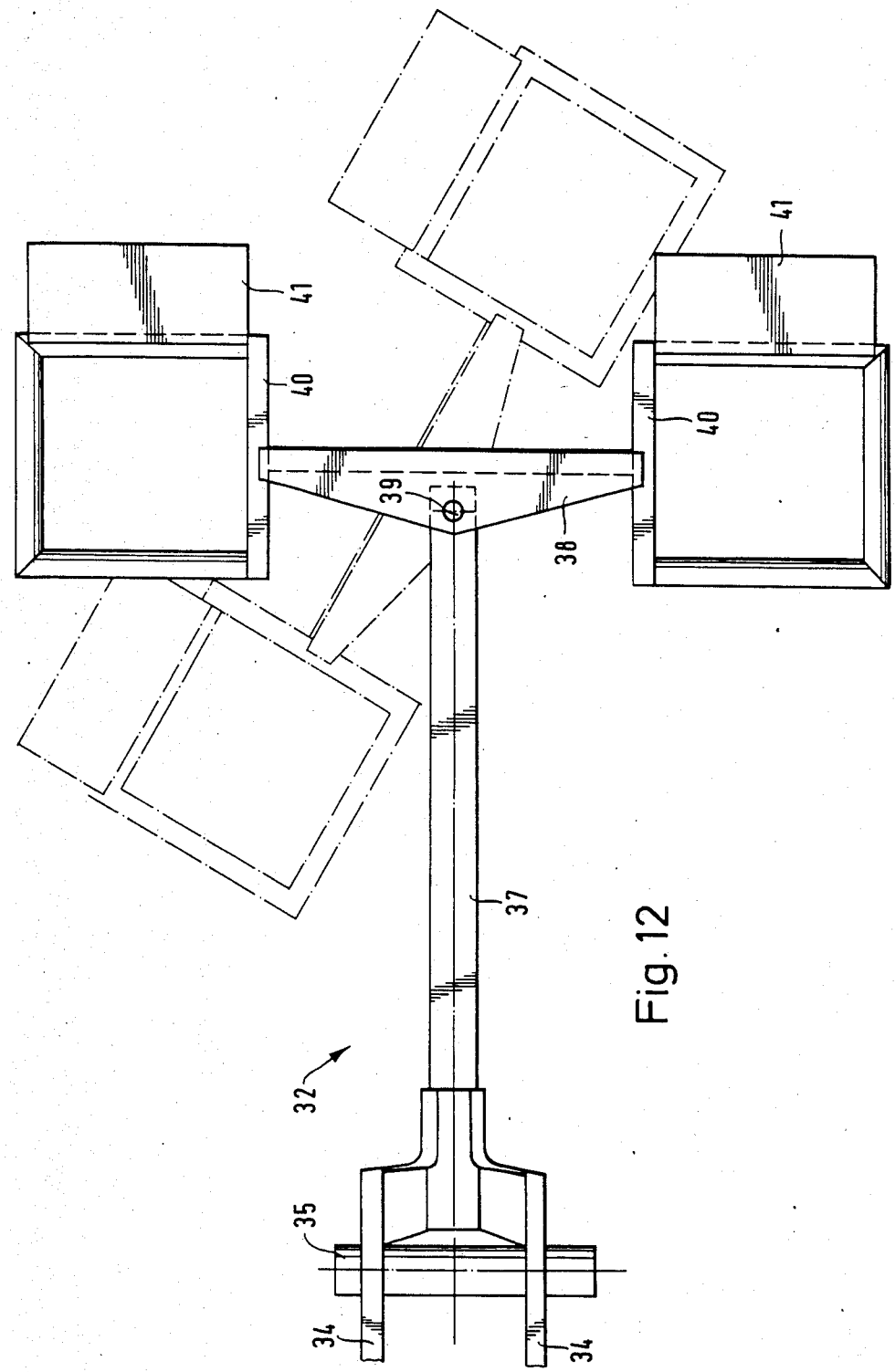
FIG. 12 is a plan view of the supporting device of FIG. 11.

As shown in FIGS. 11 and 12, a Z-shaped supporting device 32 is associated with the lifting bracket 14 of the crane 1 to extend under the vehicle that is to be towed. The upper horizontal arm 33 of the supporting device 32, which has two arms 34 in the forward region, extends over a crossbar 35 of the lifting bracket 14. The free ends of the arms 34, that form the arm 33, are secured to the shaft 6 of the boom 4 by a locking mechanism 36. The front end of the lower horizontal arm 37 of the Z-shaped supporting device 32 is provided with a crossbeam 38 that is pivotable about a vertical shaft 39. The two ends of the crossbeam 38 are provided with a respective rectangular supporting frame 40 having a ramp 41. As shown in FIG. 11, the two supporting frames 40 are provided, for example, for receiving the front or rear wheels of the vehicle that is to be towed.

Taken as a whole, the present invention provides a towing apparatus with which not only trucks but also small passenger vehicles can be satisfactorily towed. The towing apparatus is extremely straightforward, has a lightweight, and is therefore economical to manufacture. The vehicle that is to be towed is always drawn directly and close to the towing vehicle, so that the latter always has a satisfactory steering capability, even at high speeds. Furthermore, it is also readily possible with the inventive apparatus to recover vehicles that are located at a distance from the towing vehicle in an area that has no paths. An example of this situation is a vehicle that has been involved in an accident and must first be pulled in via the withdrawn cable 2, whereupon the vehicle can be raised by pivoting up the boom 4 prior to the towing process. A further advantage of the present invention is that the winch that is already installed in the vehicle can be utilized as a recovery winch for the towing crane and as an operating winch for performing numerous other operations without the towing crane.

The present invention is, of course, in no way restricted to the specific disclosure of the specification and drawings, but also encompasses any modifications within the scope of the appended claims.

What I claim is:

1. An apparatus for recovering and towing a vehicle, with said apparatus being provided on a truck that has a winch with a draw cable; said apparatus comprises:
   a crane that includes a frame, which is connected to said truck, a boom, which is pivotably connected to said frame, and a lifting bracket, which is connectable to a vehicle that is to be recovered and/or towed;

coupling means for detachably connecting said draw cable to said boom;

a substantially horizontally extending shaft connected to said frame and said boom, at a location remote from said coupling means, to effect said pivotable connection of said boom to said frame; said lifting bracket being operatively associated with said draw cable and said boom in such a way that said lifting bracket can be raised and lowered; said boom being adapted to be pivoted between a raised position and a lowered position;

locking pin means disposed on said frame, in the region between said coupling means and said substantially horizontally extending shaft, for locking said boom at least in said raised position;

two spaced-apart guide pulleys, with said draw cable being guided around said pulleys in an approximately S-shaped manner;

said lifting bracket being secured to said draw cable; and said coupling means comprising: a C-shaped stop recess means formed on said boom on a portion of the latter remote from said substantially horizontally extending shaft, and a coupling pin connected to said lifting bracket; when said draw cable is drawn in, said coupling pin engages in said stop recess means, said frame being made triangular with an upper corner, one of said guide pulleys having an axis of rotation in the upper corner of said triangular frame whereby a lower part of said draw cable passes over the other of said guide pulleys and leads directly to said winch on the truck and an upper end of said draw cable leads to said coupling means.

2. An apparatus according to claim 1, in which said portion of said boom remote from said substantially horizontally extending shaft is embodied as a pronged member having two parallel legs; in which said stop recess means comprises a respective C-shaped stop recess in each of said legs for receiving said coupling pin of said lifting bracket; and in which, for centering said coupling pin when it is introduced into said stop recesses, said coupling pin is provided with two conical guide elements that are disposed between said legs of said boom when said coupling pin engages said stop recesses, said boom when arrested in upright position by said locking pin means having a substantially upwardly extending portion with a transition into a rearwardly portion with a free end on which said bracket is provided.

3. An apparatus for recovering and towing a vehicle, with said apparatus being provided on a truck that has a winch with a draw cable; said apparatus comprises:

a crane that includes a frame, which is connected to said truck, a boom, which is pivotably connected to said frame, and a lifting bracket, which is connectable to a vehicle that is to be recovered and/or towed;

coupling means for detachably connecting said draw cable to said boom; and a substantially horizontally extending shaft connected to said frame and said boom, at a location remote from said coupling means, to effect said pivotable connection of said boom to said frame; said lifting bracket being operatively associated with said draw cable and said boom in such a way that said lifting bracket can be raised and lowered, said lifting bracket being secured to said draw cable;

said coupling means comprising: a C-shaped stop recess means formed on said boom on a portion of the latter remote from said substantially horizontally extending shaft, and a coupling pin connected to said lifting bracket; when said draw cable is drawn in, said coupling pin engages in said stop recess means; said portion of said boom remote from said substantially horizontally extending shaft being embodied as a pronged member having two parallel legs; in which said stop recess means comprises a respective C-shaped stop recess in each of said legs for receiving said coupling pin of said lifting bracket; and in which, for centering said coupling pin when it is introduced into said stop recesses, said coupling pin being provided with two conical guide elements that are disposed between said legs of said boom when said coupling pin engages said stop recesses;

said coupling pin of said lifting bracket having two ends, each of which extends beyond a given one of said stop recesses when engaging same; and two securing rods that are connected to said boom and respectively extend over a given one of said ends of said coupling pin to fix the position of the latter in said stop recesses.

4. An apparatus according to claim 3, in which said boom is adapted to be pivoted between a raised position and a lowered position; and which includes locking pin means disposed on said frame, in the region between said coupling means and said substantially horizontally extending shaft, for locking said boom at least in said raised position.

5. An apparatus according to claim 4, which includes at least one guide pulley interposed between said winch and said coupling means on said frame, with said draw cable being guided around said at least one guide pulley.

6. An apparatus according to claim 5, which includes two spaced-apart guide pulleys, with said draw cable being guided around said pulleys in an approximately S-shaped manner.

7. An apparatus according to claim 6, in which one of said guide pulleys is closer to said coupling means, in the raised position of said boom, than is the other of said guide pulleys; and which includes a further guide pulley disposed in the region between said closer guide pulley and said coupling means for guiding said draw cable.

8. An apparatus according to claim 3, in which said stop recess means on said boom has an open side provided with at least one slanted lead-in surface for receiving said coupling pin.

9. An apparatus according to claim 3, which includes a lever system connected to said securing rods for pivoting the latter away from said ends of said coupling pin to release the latter, and for pivoting said securing rods toward said ends of said coupling pin for securing the latter in position.

10. An apparatus according to claim 9, in which said lever system includes a control handle that extends at right angles from said boom.

11. An apparatus according to claim 10, in which said boom is provided with a control element for effecting pivoting of said control handle.

12. An apparatus according to claim 3, which includes a Z-shaped supporting device that is associated with said lifting bracket; said supporting device has a first end for extending below a vehicle that is to be towed, and a second end, remote from said first end, that is fixed to said substantially horizontally extending shaft via a locking mechanism; adjacent to said second end of said supporting device, the latter is provided with a first substantially horizontal arm that extends over a crossbar of said lifting bracket; adjacent to said first end of said supporting device, the latter has a second substantially horizontal arm that is connected to said first arm and is provided with a crossbeam that is pivotably connected to said second arm via a vertical shaft; said crossbeam is provided with two spaced-apart supporting frames for accommodating wheels of said vehicle that is to be towed.

* * * * *